(12) United States Patent
Park et al.

(10) Patent No.: US 11,390,208 B2
(45) Date of Patent: Jul. 19, 2022

(54) SYSTEM AND METHOD FOR CONTROLLING A HEADLAMP FOR A VEHICLE USING A CAPTURED IMAGE OF A FORWARD VEHICLE AND CENTERING A SHADOW ZONE THEREON

(71) Applicants: HYUNDAI MOTOR COMPANY, Seoul (KR); KIA CORPORATION, Seoul (KR)

(72) Inventors: Sung Ho Park, Seoul (KR); Byoung Suk Ahn, Gwacheon-si (KR); Seung Sik Han, Hwaseong-si (KR); Ki Hong Lee, Seoul (KR); Jung Wook Lim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/307,763

(22) Filed: May 4, 2021

(65) Prior Publication Data
US 2022/0126747 A1 Apr. 28, 2022

(30) Foreign Application Priority Data
Oct. 27, 2020 (KR) .................. 10-2020-0140562

(51) Int. Cl.
*B60Q 1/14* (2006.01)
(52) U.S. Cl.
CPC ...... *B60Q 1/1423* (2013.01); *B60Q 2300/054* (2013.01); *B60Q 2300/122* (2013.01); *B60Q 2300/322* (2013.01); *B60Q 2300/41* (2013.01); *B60Q 2300/42* (2013.01)

(58) Field of Classification Search
CPC .. B60Q 1/1423; B60Q 1/142; B60Q 2300/41; B60Q 2300/42; B60Q 2300/054; B60Q 2300/056; B60Q 2300/12; B60Q 2300/13
See application file for complete search history.

(56) References Cited

U.S. PATENT DOCUMENTS

| 9,260,053 B2 * | 2/2016 | Park ................. B60Q 1/143 |
| 9,566,900 B2 * | 2/2017 | Schmidt ............ B60Q 1/1423 |
| 2016/0167567 A1 * | 6/2016 | Foltin ................ B60Q 1/143 315/82 |

FOREIGN PATENT DOCUMENTS

| KR | 101232308 | 2/2013 |
| KR | 20160112429 A | 9/2016 |

* cited by examiner

*Primary Examiner* — Robert J May
(74) *Attorney, Agent, or Firm* — Fox Rothschild LLP

(57) ABSTRACT

A system for controlling a headlamp for a vehicle is provided. The system includes a lamp unit comprising a plurality of light sources and configured to form a shadow zone in a light emission area by adjusting a position to which light is emitted and an amount of light for each light source; an information collector configured to acquire an image of a forward side based on a travel direction; and a controller configured to receive information on a forward vehicle acquired through the information collector and information on the shadow zone, and control the lamp unit to perform aiming correction of the shadow zone to position the forward vehicle at a central side of the shadow zone when the forward vehicle is not positioned at the central side of the shadow zone within the shadow zone.

11 Claims, 5 Drawing Sheets

NORMAL

ABNORMAL

SYSTEM AND METHOD FOR CONTROLLING A HEADLAMP FOR A VEHICLE USING A CAPTURED IMAGE OF A FORWARD VEHICLE AND CENTERING A SHADOW ZONE THEREON

CROSS-REFERENCE TO RELATED APPLICATION

This application claims priority to and the benefit of Korean Patent Application No. 10-2020-0140562, filed on Oct. 27, 2020, the disclosure of which is incorporated herein by reference in its entirety.

TECHNICAL FIELD

The present disclosure relates to a system and method for controlling a headlamp for a vehicle, and more particularly to a system and method for controlling a headlamp for a vehicle for controlling a shadow zone of a headlamp.

BACKGROUND

In general, a vehicle includes a lamp having a lighting function for easily identifying an object positioned around the vehicle when driving at night and a signaling function for signaling a travel state of the vehicle to other vehicles or road users. For example, a headlamp, a rear lamp, a fog light, and the like are used for lighting, and a turn signal lamp, a tail lamp, a brake lamp, and the like are used for signaling.

When driving a vehicle at night or in a tunnel having low luminous intensity, a driver is capable of safely driving the vehicle by identifying areas in front of and behind of the vehicle using light emitted from a light source used in a headlamp or a tail lamp of the vehicle. In this case, a lamp of the vehicle includes an optical functional body and a plurality of reflective surfaces in order to appropriately disperse light emitted from the light source or to polarize or condense light to change a travel direction of refracted light to a forward direction.

Recently, there has been an increasing need for safety for achieving safe driving. For example, when a headlamp of a vehicle is turned on while the vehicle travels at night, a driver of a preceding vehicle or an oncoming vehicle positioned ahead based on a travel direction is subjected to glare and the possibility of car accidents increases, and inhibiting a visual field of a driver of a preceding vehicle or an oncoming vehicle from being obstructed while ensuring a visual field of a subject vehicle may be desirable.

It will be understood that the above matters described in the related art are merely for promotion of understanding of the background of the present disclosure, and should not be recognized as prior art that is well-known to those skilled in the art.

SUMMARY

Therefore, the present disclosure provides a system and method for controlling a headlamp for a vehicle for preventing a driver of a forward vehicle from being subjected to glare by forming a shadow zone with respect to the forward vehicle and forming the shadow zone at the accurate position by correcting the position at which the shadow zone is formed with respect to the forward vehicle.

In accordance with an aspect of the present disclosure, a system for controlling a headlamp for a vehicle may be provided. The system includes a lamp unit including a plurality of light sources and configured to form a shadow zone in a light emission area by adjusting a position to which light is emitted and an amount of light for each light source, an information collector configured to acquire an image of a forward side based on a travel direction, and a controller configured to receive information on a forward vehicle acquired through the information collector and information on the shadow zone formed by the lamp unit, and to control the lamp unit to perform aiming correction of the shadow zone to position the forward vehicle at a central side of the shadow zone when the forward vehicle is not positioned at the central side of the shadow zone within the shadow zone.

The information collector may check whether each of left and right sides of a headlamp or a rear lamp of the forward vehicle is turned on, and the controller may not perform aiming correction of the shadow zone depending on positions of the shadow zone and the forward vehicle when at least one of the left and right sides of the headlamp or the rear lamp of the forward vehicle is not turned on.

When determining that a road in a travel direction is a straight road having a predetermined distance or greater through a communication device, the controller may perform aiming correction of the shadow zone depending on positions of the shadow zone and the forward vehicle.

The system may further include a travel state information unit configured to recognize a travel state of the vehicle, wherein the controller may receive information on a steering angle of a steering wheel and a height of the vehicle from the travel state information unit and may perform aiming correction of the shadow zone depending on positions of the shadow zone and the forward vehicle upon determining that the vehicle travels straight and travels on a flat road.

The information collector may acquire the image of the forward side based on the travel direction and classifies the forward vehicle into a preceding vehicle and an oncoming vehicle, and upon receiving information indicating that both the preceding vehicle and the oncoming vehicle are present, the controller may perform aiming correction of the shadow zone depending on positions of the shadow zone and the forward vehicle by prioritizing the preceding vehicle.

The information collector may recognize opposite ends of the forward vehicle and opposite ends of the shadow zone, and the controller may determine whether a distance between the opposite ends of the shadow zone and a distance between the opposite ends of the forward vehicle match each other.

The controller may compare a one-side distance between a one-side end of the shadow zone and a one-side end of the forward vehicle with a remaining-side distance between a remaining-side end of the shadow zone and a remaining-side end of the forward vehicle, and may control the lamp unit to make the one-side distance and the remaining-side distance the same as each other when the one-side distance and the remaining-side distance are different from each other.

The controller may check whether the forward vehicle is positioned at the central side of the shadow zone within the shadow zone, and may perform aiming correction of the shadow zone upon determining that a distance from the forward vehicle is equal to or greater than a pre-stored setting distance through the information collector.

In another aspect, a method of controlling a headlamp for a vehicle includes emitting light to form a shadow zone with respect to a forward vehicle in a light emission area, acquiring an image of a forward side based on a travel direction, collecting information on the forward vehicle, and checking the shadow zone, determining whether the forward vehicle is positioned at a central side of the shadow zone within the shadow zone, and correcting a position at which the shadow zone is formed to position the forward vehicle at the central side of the shadow zone when the forward vehicle is not positioned at the central side of the shadow zone within the shadow zone.

The method may further include determining whether the vehicle travels straight and determining whether the vehicle travels on a flat road by recognizing a travel state of the vehicle based on information on a steering angle of a steering wheel and information on a height of the vehicle, wherein the determining whether the forward vehicle is positioned at the central side of the shadow zone within the shadow zone may include determining whether the forward vehicle is positioned at the central side of the shadow zone within the shadow zone upon determining that the vehicle travels straight and travels on the flat road.

The acquiring the image may include classifying and determining as either the forward vehicle into a preceding vehicle or an oncoming vehicle, and the determining whether the forward vehicle is positioned at the central side of the shadow zone within the shadow zone may include checking whether the forward vehicle is positioned at the central side of the shadow zone within the shadow zone by prioritizing the preceding vehicle upon receiving information indicating that both the preceding vehicle and the oncoming vehicle are present.

The acquiring the image may include recognizing opposite ends of the forward vehicle and opposite ends of the shadow zone, and the determining whether the forward vehicle is positioned at the central side of the shadow zone within the shadow zone may include determining whether a distance between the opposite ends of the shadow zone and a distance between the opposite ends of the forward vehicle match each other.

The determining whether the forward vehicle is positioned at the central side of the shadow zone within the shadow zone may include comparing a one-side distance between a one-side end of the shadow zone and a one-side end of the forward vehicle with a remaining-side distance between a remaining-side end of the shadow zone and a remaining-side end of the forward vehicle, and the correcting the position may include adjusting a position at which the shadow zone is formed to make the one-side distance and the remaining-side distance the same as each other when the one-side distance and the remaining-side distance are different from each other.

DRAWINGS

DETAILED DESCRIPTION

Reference will now be made in detail to a system and method for controlling a headlamp for a vehicle according to exemplary embodiments of the present disclosure, examples of which are illustrated in the accompanying drawings.

Figure 1:
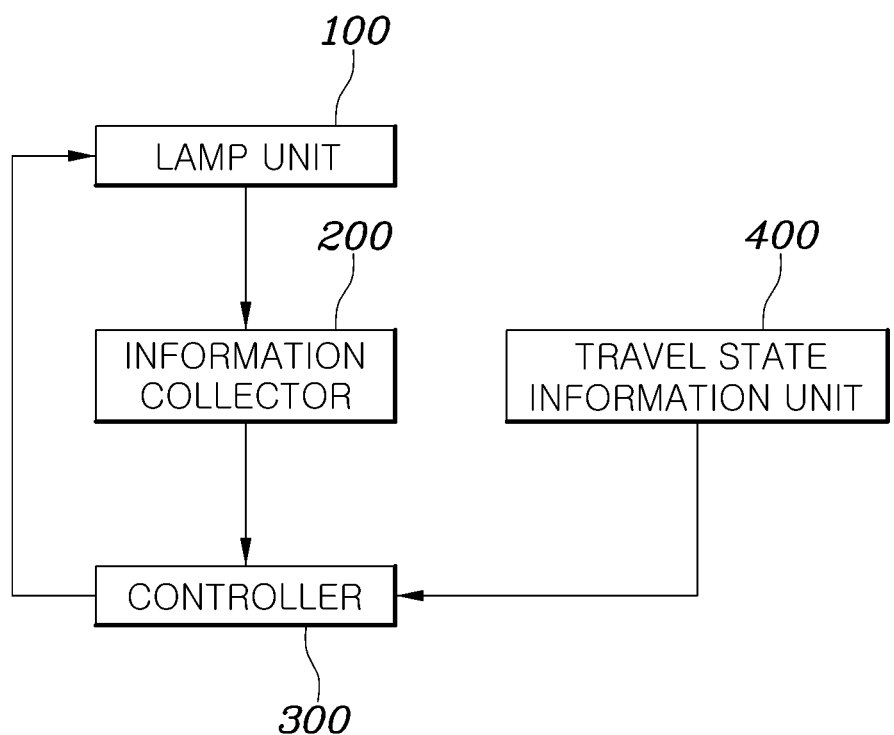
FIG. 1 is a diagram showing the configuration of a system for controlling a headlamp for a vehicle in one form of the present disclosure.
Figure 2:
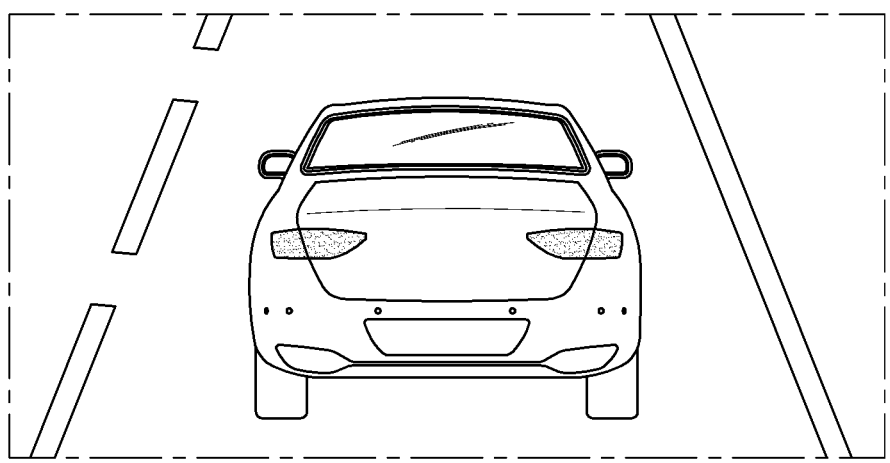
FIGS. 2 and 3 are diagrams for explaining the system for controlling a headlamp for a vehicle shown in FIG. 1.
Figure 2:
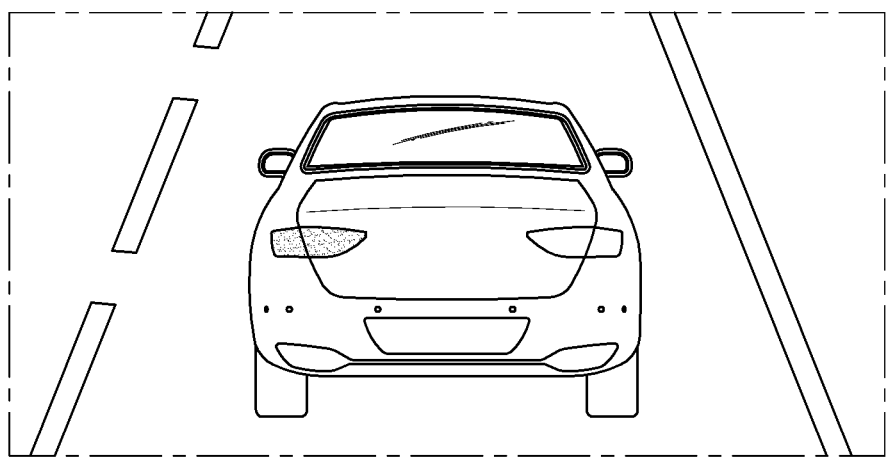
Figure 3:
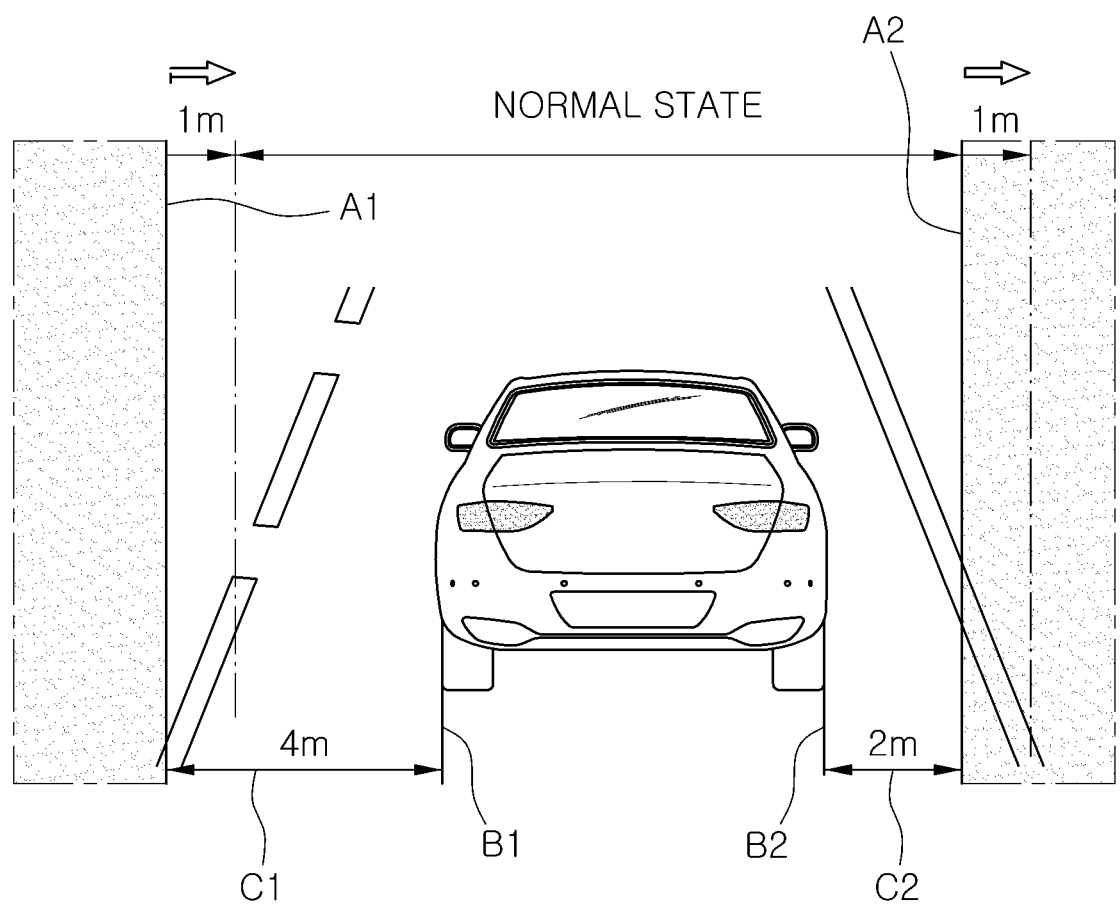
Figure 4:
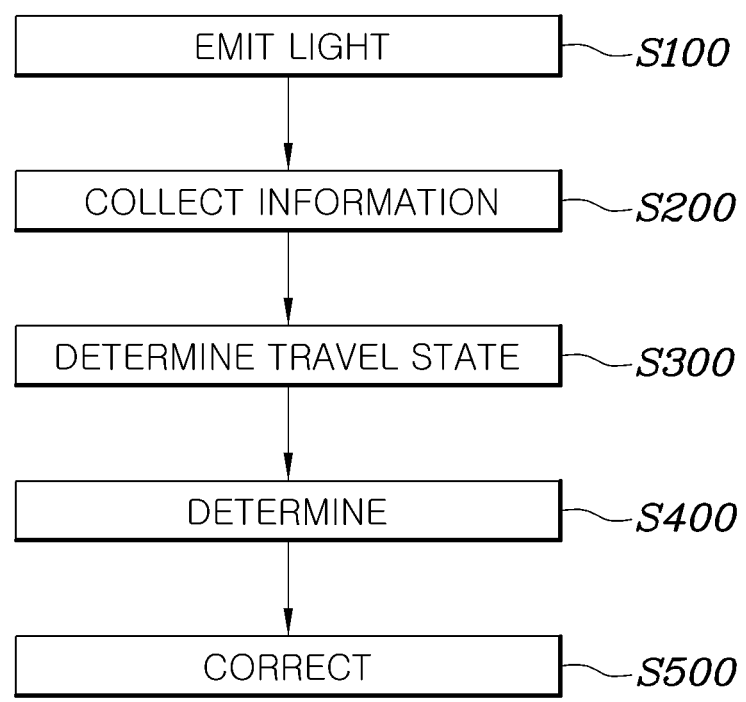
FIGS. 4 and 5 are flowcharts of a method of controlling a headlamp for a vehicle.
Figure 5:
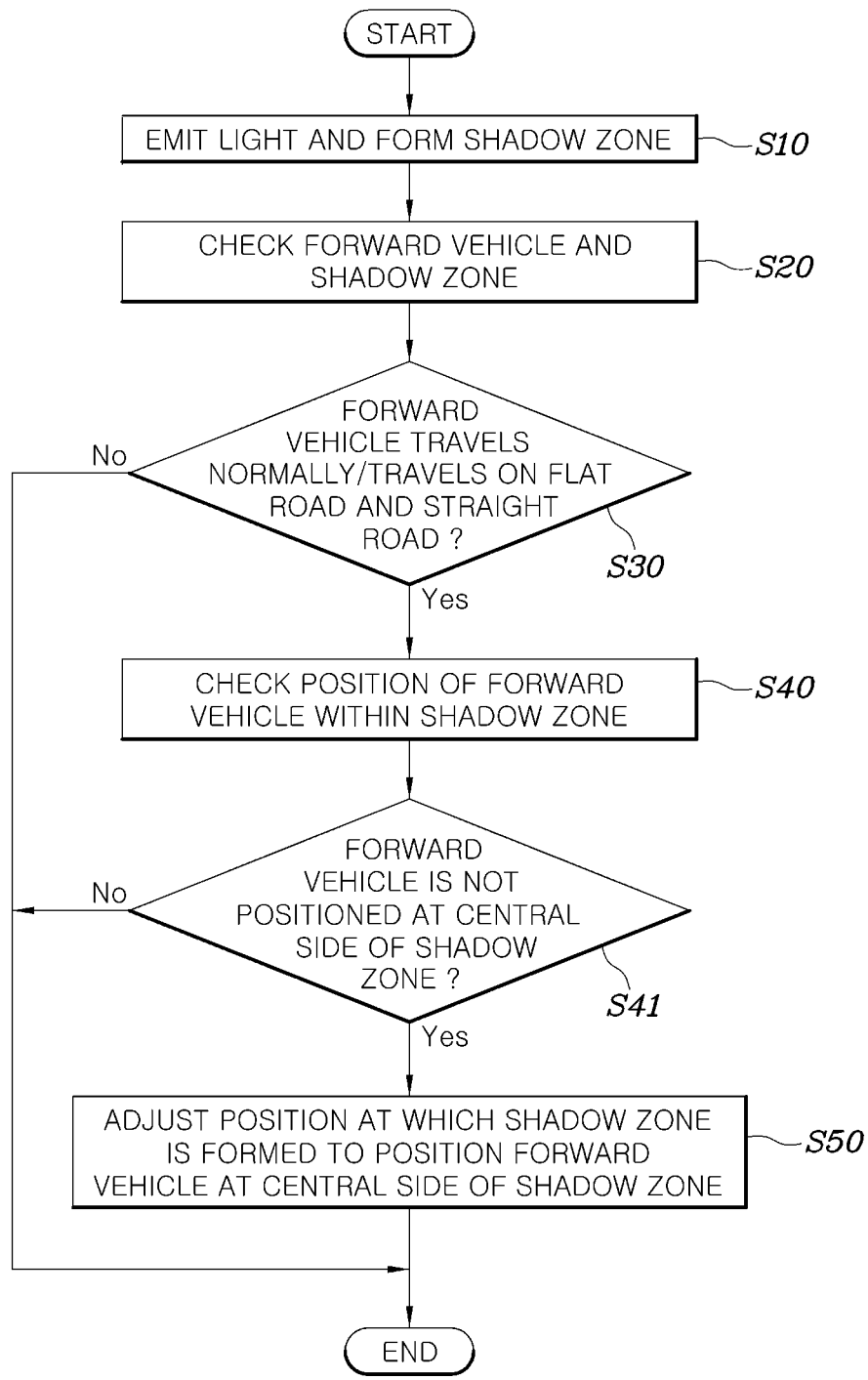

FIG. 1 is a diagram showing the configuration of a system for controlling a headlamp for a vehicle in some forms of the present disclosure. FIGS. 2 and 3 are diagrams for explaining the system for controlling a headlamp for a vehicle shown in FIG. 1. FIGS. 4 and 5 are flowcharts of a method of controlling a headlamp for a vehicle.

As shown in FIG. 1, the system for controlling a headlamp for a vehicle according to the present disclosure may include a lamp unit 100 including a plurality of light sources and configured to form a shadow zone in a light emission area by adjusting the position at which light is emitted and the amount of light for each light source, an information collector 200 configured to acquire an image of a forward side based on a travel direction, and a controller 300 configured to receive information on a forward vehicle acquired through the information collector 200 and information on the shadow zone formed by the lamp unit 100 and to control the lamp unit 100 to perform aiming correction of the shadow zone to position the forward vehicle at a central side of the shadow zone when the forward vehicle is not positioned at the central side of the shadow zone within the shadow zone.

Here, the lamp unit 100 may include an adaptive driving beam (ADB) headlamp and may form a shadow zone in the light emission area by adjusting the position to which light of each light source is emitted or the amount of light of each light source. That is, the lamp unit 100 may realize the shadow zone using a swiveling method by driving a swiveling actuator or a matrix method by turning on or off a light source.

The information collector 200 may include a camera sensor to acquire an image of a forward side based on a travel direction and to recognize the position of light based on the acquired image. That is, the information collector 200 may acquire the image of the forward side based on the travel direction to recognize the forward vehicle depending on the position of light from a rear lamp of a preceding vehicle or a headlamp of an oncoming vehicle. The information collector 200 may also recognize the shadow zone formed by the lamp unit 100 based on brightness, contrast, color temperature, sharpness, or the like.

The controller 300 may receive the information on the forward vehicle acquired through the information collector 200 and the information on the shadow zone formed by the lamp unit 100. Here, the controller 300 may check whether a forward vehicle is positioned at the central side of the shadow zone within the shadow zone, and may determine that the shadow zone formed by the lamp unit 100 is not appropriately aimed when the forward vehicle is not positioned at the central side of the shadow zone. Thus, the controller 300 may control the lamp unit 100 to perform aiming correction of the shadow zone to position the forward vehicle at the central side of the shadow zone, and thus may form the shadow zone at an accurate position in the forward vehicle.

As such, the controller 300 may accurately position the shadow zone formed by the lamp unit 100 in the forward vehicle to improve the precision with which the shadow zone is formed, thereby preventing a driver of a forward vehicle from being subjected to glare.

The information collector 200 may check whether each of left and right sides of the headlamp or the rear lamp of the forward vehicle is turned on, and when at least one of the left and right sides of the headlamp or the rear lamp of the forward vehicle is not turned on, the controller 300 may not perform aiming correction of the shadow zone depending on the position of the shadow zone and the position of the forward vehicle.

As such, the information collector 200 may check whether the left and right sides of the headlamp or the rear lamp of the forward vehicle are turned on, and thus may determine whether a camera sensor is operating normally, and may accurately recognize the forward vehicle. That is, as shown in FIG. 2, when the information collector 200 determines that at least one of the left and right sides of the headlamp or the rear lamp of the forward vehicle is not turned on, the controller 300 may determine that the camera sensor is abnormal or that there is no forward vehicle, and may not perform aiming correction of the shadow zone depending on the positions of the shadow zone and the forward vehicle.

As such, when the information collector 200 determines that the left and right sides of the headlamp or the rear lamp of the forward vehicle are turned on, the controller 300 may determine that a camera is not abnormal and may perform aiming correction of the shadow zone on another forward vehicle.

Upon determining through a communication device that a road in a travel direction is a straight road having a predetermined distance or greater, the controller 300 may perform aiming correction of the shadow zone depending on the positions of the shadow zone and the forward vehicle. Here, the communication device may be a navigation device, and when receiving information indicating that a road in a travel direction is a straight road with a predetermined distance or greater through the communication device, the controller 300 may perform aiming correction of the shadow zone depending on the positions of the shadow zone and the forward vehicle. When a driving road is a sloped road or a curved road, a turned-on side of the left and right sides of the headlamp or the rear lamp of the forward vehicle may be changed, or a position different from an initial design of a corresponding vehicle may be detected as a turned-on side, and thus it may be impossible to accurately determine the position of the shadow zone in the forward vehicle. This causes an error with regard to the position at which the shadow zone is formed during aiming correction of the shadow zone, and thus when determining that a road in a travel direction is a straight road with a predetermined distance or greater, the controller 300 may perform aiming correction of the shadow zone depending on the positions of the shadow zone and the forward vehicle.

The system for controlling a headlamp for a vehicle may further include a travel state information unit 400 for recognizing a travel state of the vehicle, and the controller 300 may receive information on a travel state of the vehicle depending on a steering angle of a steering wheel and the height of the vehicle from the travel state information unit 400, and when determining that the vehicle travels straight and whether the vehicle travels on a flat road, the controller 300 may perform aiming correction of the shadow zone depending on the positions of the shadow zone and the forward vehicle.

That is, the controller 300 may determine whether the vehicle travels straight and whether the vehicle travels on a flat road based on the information on the steering angle of the steering wheel and the information on the height of the vehicle. Here, when the vehicle travels straight, as a change in the steering angle is 0°, and the vehicle travels on a road without slope as the height of the vehicle is not changed, the controller 300 may accurately correct the position of the forward vehicle, at which the shadow zone is formed, by performing aiming correction of the shadow zone depending on the positions of the shadow zone and the forward vehicle. In addition, when recognizing that the position of the headlamp or the rear lamp of the forward vehicle is maintained for a predetermined time or greater through the information collector 200, the controller 300 may perform aiming correction of the shadow zone depending on the position of the shadow zone and the position of the forward vehicle.

As such, the controller 300 may accurately correct and set the position at which the shadow zone is formed with respect to the forward vehicle by performing aiming correction of the shadow zone of the lamp unit 100 when the condition in which the vehicle travels straight, the condition in which the vehicle travels on a flat road, and the condition pertaining to the position of the forward vehicle are satisfied.

The information collector 200 may acquire an image of a forward side based on a travel direction, and may classify a forward vehicle into a preceding vehicle and an oncoming vehicle, and when receiving information indicating that both the preceding vehicle and the oncoming vehicle are present, the controller 300 may perform aiming correction of the shadow zone depending on the position of the shadow zone and the position of the forward vehicle by prioritizing the preceding vehicle higher than the oncoming vehicle.

When recognizing that the preceding vehicle and the oncoming vehicle are simultaneously present through the information collector 200, the controller 300 may perform aiming correction of the shadow zone depending on the shadow zone and the position of the forward vehicle by prioritizing the preceding vehicle that is recognized by the camera sensor with superior recognition capability than the oncoming vehicle. That is, in the case of the oncoming vehicle, the subject vehicle and the oncoming vehicle approach each other, whereby a relative velocity may be increased and the recognition capability of the camera sensor may be lowered compared with the preceding vehicle. Thus, when recognizing that the preceding vehicle and the oncoming vehicle are simultaneously present through the information collector 200, the controller 300 may perform aiming correction of the shadow zone by prioritizing the preceding vehicle.

Aiming correction of a shadow zone will be described below in detail.

The information collector 200 may recognize opposite ends of the forward vehicle and opposite ends of the shadow zone, and the controller 300 may determine whether the distance between the opposite ends of the shadow zone and the distance between the opposite ends of the forward vehicle match each other.

That is, the information collector 200 may recognize the opposite ends of the forward vehicle through the left and right sides of the headlamp or the rear lamp of the forward vehicle, and may recognize the opposite ends of the shadow zone through brightness, contrast, color temperature, or the like.

As such, the controller 300 may compare the opposite ends of the shadow zone and the opposite ends of the forward vehicle, which are input through the information collector 200, and may perform aiming correction of the shadow zone by controlling the lamp unit 100 to make the opposite ends of the shadow zone and the opposite ends of the forward vehicle the same as each other. As such, the lamp unit 100 may perform aiming correction of the shadow zone by making the opposite ends of the shadow zone and the opposite ends of the forward vehicle the same as each other, and thus the shadow zone may be formed at an accurate position of the forward vehicle.

When determining that the distance from the forward vehicle is equal to or greater than a pre-stored setting distance through the information collector 200, the controller 300 may check whether the forward vehicle is positioned at the central side of the shadow zone within the shadow zone and may perform aiming correction of the shadow zone. According to the present disclosure, when the subject vehicle is relatively far from the forward vehicle, formation of the shadow zone may be highly valid, and when the subject vehicle and the forward vehicle are too close to each other, and a change in the position of the forward vehicle is relatively high, the accuracy of correcting aiming of the shadow zone may be lowered. Thus, when recognizing that the distance from the forward vehicle is equal to or greater than a pre-stored setting distance through the information collector 200, the controller 300 may check whether the forward vehicle is positioned at the central side of the shadow zone within the shadow zone, and may perform aiming correction of the shadow zone.

In detail, the controller 300 may compare a one-side distance C1 between a one-side end A1 of the shadow zone and a one-side end B1 of the forward vehicle with the other-side distance C2 between the other-side end A2 of the shadow zone and the other-side end B2 of the forward vehicle, and when the one-side distance C1 and the other-side distance C2 are different from each other, the lamp unit 100 may be controlled to make the one-side distance C1 and the other-side distance C2 the same as each other.

For example, as shown in FIG. 3, when checking that the one-side distance C1 of the shadow zone is 4 m and the other-side distance C2 is 2 m through the information collector 200, the controller 300 may control the lamp unit 100 to change the position at which the shadow zone is formed, to the other side. That is, when the position at which the shadow zone is formed is changed to the other side by as much as 1 m through aiming correction of the shadow zone of the lamp unit 100, the one-side distance C1 and the other-side distance C2 may match each other, and may be 3 m.

As such, the controller 300 may recognize the distance between the opposite ends of the shadow zone and the distance between the opposite ends of the forward vehicle and may control the lamp unit 100 through calculation of making the distances the same as each other, and thus the shadow zone may be formed at an accurate position with respect to the forward vehicle by performing aiming correction of the shadow zone of the lamp unit 100.

As shown in FIGS. 4 and 5, a method of controlling a headlamp for a vehicle according to the present disclosure may include emitting light to form a shadow zone with respect to a forward vehicle in a light emission area (S100), acquiring an image of a forward side based on a travel direction, collecting information on the forward vehicle, checking the shadow zone (S200), determining whether the forward vehicle is positioned at the central side of the shadow zone within the shadow zone (S300), and correcting the position at which the shadow zone is formed to position the forward vehicle at the central side of the shadow zone when the forward vehicle is not positioned at the central side of the shadow zone within the shadow zone (S400).

That is, according to the present disclosure, whether the forward vehicle is positioned at the central side of the shadow zone within the shadow zone may be recognized, and when the forward vehicle is not positioned at the central side of the shadow zone, the position at which the shadow zone is formed may be adjusted so as to position the forward vehicle at the central side of the shadow zone. Here, the position at which the shadow zone is formed may be adjusted using a swiveling method by driving a swiveling actuator of the lamp unit 100 or a matrix method by turning on or off a light source. Thus, according to the present disclosure, the position at which the shadow zone may be accurately formed with respect to the forward vehicle, and thus the accuracy of forming the shadow zone may be improved, thereby preventing a driver of the forward vehicle from being subjected to glare.

The method may further include determining whether the vehicle travels straight and whether the vehicle travels on a flat road by recognizing a travel state of the vehicle based on information on a steering angle of a steering wheel and information on the height of the vehicle (S500), and the determining whether the forward vehicle is positioned at the central side of the shadow zone within the shadow zone (S300) may include determining whether the forward vehicle is positioned at the central side of the shadow zone within the shadow zone when determining that the vehicle travels straight and travels on the flat road.

That is, the determining whether the vehicle travels straight and whether the vehicle travels on a flat road (S500) may include determining whether the vehicle travels straight and whether the vehicle travels on a flat road based on the information on the steering angle of the steering wheel and the information of the height of the vehicle, and the determining whether the forward vehicle is positioned at the central side of the shadow zone within the shadow zone (S300) may include determining whether the forward vehicle is positioned at the central side of the shadow zone within the shadow zone when determining that the vehicle travels straight and travels on a flat road. The determining whether the forward vehicle is positioned at the central side of the shadow zone within the shadow zone (S300) may include further checking whether the position of the headlamp or the rear lamp of the forward vehicle is maintained for a predetermined time or greater.

As such, according to the present disclosure, when the condition in which the vehicle travels straight, the condition in which the vehicle travels on a flat road, and the condition pertaining to the position of the forward vehicle are satisfied, the position at which the shadow zone is formed may be adjusted to position the forward vehicle at the central side of the shadow zone through the correcting the position at which the shadow zone is formed (S400) by recognizing that the forward vehicle is positioned at the central side of the shadow zone within the shadow zone through the determining whether the forward vehicle is positioned at the central side of the shadow zone within the shadow zone (S300).

The collecting information on the forward vehicle (S200) may include classifying and determining the forward vehicle as either a preceding vehicle or an oncoming vehicle, and the determining whether the forward vehicle is positioned at the central side of the shadow zone within the shadow zone (S300) may include recognizing whether the forward vehicle is positioned at the central side of the shadow zone within the shadow zone by prioritizing the preceding vehicle when receiving information indicating that both a preceding vehicle and an oncoming vehicle are present. That is, when checking that the preceding vehicle and the oncoming vehicle are simultaneously present through the collecting information on the forward vehicle (S200), the determining whether the forward vehicle is positioned at the central side of the shadow zone within the shadow zone (S300) may be performed by prioritizing the preceding vehicle that is recognized by the camera sensor with superior recognition capability than the oncoming vehicle. As such, the determining whether the forward vehicle is positioned at the central side of the shadow zone within the shadow zone (S300) may be performed by prioritizing the preceding vehicle that is recognized by the camera sensor with superior recognition capability than the oncoming vehicle, and thus the position of the forward vehicle within the shadow zone may be accurately recognized, and based thereon, the accuracy of the position at which the shadow zone is formed may be increased.

The collecting information on the forward vehicle (S200) may include recognizing opposite ends of the forward vehicle and opposite sides of the shadow zone and the determining whether the forward vehicle is positioned at the central side of the shadow zone within the shadow zone (S300) may include determining whether the distance between opposite ends of the shadow zone and the distance between opposite ends of the forward vehicle match each other.

In detail, the determining whether the forward vehicle is positioned at the central side of the shadow zone within the shadow zone (S300) may include comparing a one-side distance between a one-side end of the shadow zone and a one-side end of the forward vehicle with the other-side distance between the other-side end of the shadow zone and the other-side end of the forward vehicle, and the correcting the position at which the shadow zone is formed (S400) may include adjusting the position at which the shadow zone is formed to make the one-side distance and the other-side distance the same as each other when the one-side distance and the other-side distance are different from each other.

That is, the determining whether the forward vehicle is positioned at the central side of the shadow zone within the shadow zone (S300) may include comparing the one-side distance between the opposite sides of the shadow zone and the other-side distance between the opposite sides of the forward vehicle with each other, and the correcting the position at which the shadow zone is formed (S400) may include correcting the position at which the shadow zone is formed to make the one-side distance between the opposite sides of the shadow zone and the other-side distance between the opposite sides of the forward vehicle the same as each other. Here, the determining whether the forward vehicle is positioned at the central side of the shadow zone within the shadow zone (S300) may include checking whether the forward vehicle is positioned at the central side of the shadow zone within the shadow zone when determining that the distance from the forward vehicle is equal to or greater than a pre-stored setting distance.

As such, according to the present disclosure, the distance between the opposite ends of the shadow zone and the distance between the opposite ends of the forward vehicle may be recognized, and the position at which the shadow zone is formed may be adjusted through calculation of making the distances the same as each other, and thus the shadow zone may be formed at an accurate position with respect to the forward vehicle.

That is, the control method according to the present disclosure may include forming the shadow zone with respect to the forward vehicle in a light emission area (S10) and checking information on the forward vehicle and the shadow zone (S20). In this case, checking the state of an operation of a lamp of the forward vehicle and determining whether the forward vehicle is in a normal state, and whether a subject vehicle travels on a flat road and whether the vehicle travels on a straight road (S30) may be performed, and when all of these are satisfied, recognizing the position of the forward vehicle within the shadow zone (S40) may be performed.

Here, adjusting the position at which the shadow zone is formed and positioning the forward vehicle at the central side of the shadow zone (S41 and S50) may be performed when the forward vehicle is not positioned at the central side of the shadow zone.

The system and method for controlling a headlamp for a vehicle as configured above may prevent a driver of a forward vehicle from being subjected to glare by forming the shadow zone with respect to the forward vehicle and may form the shadow zone at an accurate position by correcting the position at which the shadow zone is formed with respect to the forward vehicle.

The system and method for controlling a headlamp for a vehicle as configured above may prevent a driver of a forward vehicle from being subjected to glare by forming the shadow zone with respect to the forward vehicle and may form the shadow zone at an accurate position by correcting the position at which the shadow zone is formed with respect to the forward vehicle.

Although the preferred embodiments of the present disclosure have been disclosed for illustrative purposes, those skilled in the art will appreciate that various modifications, additions and substitutions are possible without departing from the scope and spirit of the present disclosure as disclosed in the accompanying claims.

What is claimed is:

1. A system for controlling a headlamp for a vehicle, the system comprising:
   a lamp unit comprising a plurality of light sources and configured to form a shadow zone in a light emission area by adjusting a position to which light is emitted and an amount of light for each light source;
   an information collector configured to acquire an image of a forward side based on a travel direction; and
   a controller configured to:
      receive information on a forward vehicle acquired through the information collector and information on the shadow zone; and
      control the lamp unit to perform aiming correction of the shadow zone to position the forward vehicle at a central side of the shadow zone when the forward vehicle is not positioned at the central side of the shadow zone within the shadow zone;
   wherein the information collector is configured to check whether a left side and a right side of the headlamp or a rear lamp of the forward vehicle is turned on, and
   wherein the controller is configured to not perform aiming correction of the shadow zone depending on positions of the shadow zone and the forward vehicle when at least one of the left side or the right side of the headlamp or the rear lamp of the forward vehicle is not turned on.

2. The system of claim 1, further comprising:
   a communication device configured to determine whether a road in a travel direction is a straight road having a distance greater than or equal to a predetermined distance, wherein the controller performs aiming correction of the shadow zone depending on positions of the shadow zone and the forward vehicle when it is determined that the road in the travel direction is the straight road having the distance greater than or equal to the predetermined distance.

3. The system of claim 1, further comprising:
   a travel state information unit configured to recognize a travel state of the vehicle, wherein the controller is further configured to:
   receive information on a steering angle of a steering wheel and a height of the vehicle from the travel state information unit;

determine whether the vehicle travels straight on a flat road; and perform aiming correction of the shadow zone depending on positions of the shadow zone and the forward vehicle when the vehicle is determined to travel straight on the flat road.

4. The system of claim 1, wherein the information collector is configured to:

acquire the image of the forward side based on the travel direction; and classify the forward vehicle into a preceding vehicle and an oncoming vehicle, wherein the controller is further configured to:

determine whether both a preceding vehicle and an oncoming vehicle are present; and perform aiming correction of the shadow zone depending on positions of the shadow zone and the forward vehicle by prioritizing the preceding vehicle when both the preceding vehicle and the oncoming vehicle are determined to be present.

5. The system of claim 1, wherein:

the information collector is configured to recognize opposite side ends of the forward vehicle in a lateral direction and opposite ends of the shadow zone, and the controller is configured to determine whether a distance between the opposite ends of the shadow zone matches a distance between the opposite side ends of the forward vehicle in the lateral direction.

6. The system of claim 5, wherein the controller is configured to:

compare a one-side distance between a one-side end of the shadow zone and a one-side end of the forward vehicle with a remaining-side distance between a remaining-side end of the shadow zone and a remaining-side end of the forward vehicle; and control the lamp unit to match the one-side distance with the remaining-side distance when the one-side distance is different from the remaining-side distance.

7. The system of claim 1, wherein the controller is configured to:

check whether the forward vehicle is positioned at the central side of the shadow zone within the shadow zone;

determine whether a distance from the forward vehicle is equal to or greater than a pre-stored setting distance; and perform aiming correction of the shadow zone when it is determined that the distance from the forward vehicle is equal to or greater than the pre-stored setting distance.

8. A method of controlling a headlamp for a vehicle, the method comprising:

forming a shadow zone of a forward vehicle in a light emission area;

acquiring an image of a forward side based on a travel direction, collecting information on the forward vehicle, and checking the shadow zone;

determining whether the forward vehicle is positioned at a central side of the shadow zone within the shadow zone;

when it is determined that the forward vehicle is not positioned at the central side of the shadow zone within the shadow zone, correcting a position at which the shadow zone is formed to position the forward vehicle at the central side of the shadow zone;

determining whether the vehicle travels straight on a flat road based on information on a steering angle of a steering wheel and information on a height of the vehicle; and when it is determined that the vehicle travels straight on the flat road, determining whether the forward vehicle is positioned at the central side of the shadow zone within the shadow zone.

9. The method of claim 8, further comprising:

classifying the forward vehicle into a preceding vehicle or an oncoming vehicle;

determining whether the preceding vehicle or the oncoming vehicle is present; and when it is determined that both the preceding vehicle and the oncoming vehicle are present, checking whether the forward vehicle is positioned at the central side of the shadow zone within the shadow zone by prioritizing the preceding vehicle.

10. The method of claim 8, further comprising:

recognizing opposite side ends of the forward vehicle in a lateral direction and opposite ends of the shadow zone; and determining whether a distance between the opposite ends of the shadow zone matches a distance between the opposite side ends of the forward vehicle in the lateral direction.

11. The method of claim 10, further comprising:

comparing a one-side distance between a one-side end of the shadow zone and a one-side end of the forward vehicle with a remaining-side distance between a remaining-side end of the shadow zone and a remaining-side end of the forward vehicle; and when the one-side distance is different from the remaining-side distance, adjusting a position at which the shadow zone is formed to match the one-side distance with the remaining-side distance.

* * * * *